United States Patent [19]

Dervan et al.

[11] Patent Number: 4,778,861
[45] Date of Patent: Oct. 18, 1988

[54] COATING COMPOSITION CONTAINING HYDROXY-FUNCTIONAL EPOXY-POLYESTER GRAFT COPOLYMERS

[75] Inventors: Andrew H. Dervan, Grosse Pointe Farms; Dennis J. Grebur; Panagiotis I. Kordomenos, both of Mt. Clemens, all of Mich.

[73] Assignee: E. I. Du Pont de Nemours and Company, Wilmington, Del.

[21] Appl. No.: 82,653

[22] Filed: Aug. 7, 1987

Related U.S. Application Data

[62] Division of Ser. No. 809,808, Dec. 16, 1985, Pat. No. 4,698,400.

[51] Int. Cl.$^4$ .................. C08G 63/06; C08G 63/08; C08L 63/02
[52] U.S. Cl. .................. 525/450; 525/528; 525/533; 523/436; 523/454; 523/455; 523/456; 523/463
[58] Field of Search .................. 525/450, 528, 533

[56] References Cited

U.S. PATENT DOCUMENTS

| | | | |
|---|---|---|---|
| 2,980,208 | 6/1959 | Young et al. | 528/357 |
| 3,203,920 | 8/1965 | Nikles | 524/110 |
| 3,215,757 | 11/1965 | Scheibli | 525/112 |
| 3,382,210 | 5/1968 | Wyart et al. | 528/91 |
| 3,707,526 | 12/1972 | Gannon et al. | 525/533 |
| 3,792,112 | 2/1974 | Gannon et al. | 525/533 |
| 3,816,280 | 6/1974 | Watt | 522/32 |
| 3,951,891 | 4/1976 | Topfi et al. | 524/538 |
| 3,960,979 | 6/1976 | Khanna | 525/110 |
| 4,018,848 | 4/1977 | Khanna | 525/110 |
| 4,119,595 | 10/1978 | Bauer et al. | 523/400 |
| 4,148,772 | 4/1979 | Marchette et al. | 156/227 |
| 4,196,270 | 4/1980 | Chattha | 525/110 |
| 4,252,935 | 2/1981 | Anderson et al. | 528/45 |
| 4,296,005 | 10/1981 | Di Benedette | 525/510 |
| 4,343,925 | 8/1982 | Chang et al. | 525/440 |
| 4,436,878 | 3/1984 | Batzill et al. | 525/528 |
| 4,522,984 | 6/1985 | Watanabe et al. | 525/415 |
| 4,569,973 | 2/1986 | Tyrell et al. | 525/437 |

FOREIGN PATENT DOCUMENTS

2117382A 10/1983 United Kingdom .............. 525/533

*Primary Examiner*—Melvyn I. Marquis
*Assistant Examiner*—Robert E. L. Sellers, II
*Attorney, Agent, or Firm*—Hilmar L. Fricke

[57] ABSTRACT

A hydroxy functional epoxy-polyester graft copolymer and solvent-based thermosetting coating composition comprising said copolymer and blocked polyisocyanate crosslinking agent. The coating composition may be formulated as hot sprayable, high solids coating composition suitable for use as chip resistant automotive vehicle primer adapted for use on body panel areas subject to chipping by stones, gravel and other road debris. Alternatively, the composition may be formulated as a high solids composition sprayable with conventional spraying equipment. The hydroxy functional epoxy-polyester graft copolymer is the product of polymerization of certain lactone monomers in the presence of hydroxy functional epoxy ester resin precursor. The precursor resin is the reaction product of diepoxide with aliphatic diol and, subsequently, with acid component comprising primary hydroxy functional acid. The polymerization of the lactone monomers is carried out at a temperature between about 50° C. and about 300° C. and the polymerization reaction mixture comprises between about 10 and about 80 weight percent hydroxy functional epoxy ester resin precursor and between about 90 and about 20 weight percent lactone monomers.

14 Claims, No Drawings

COATING COMPOSITION CONTAINING HYDROXY-FUNCTIONAL EPOXY-POLYESTER GRAFT COPOLYMERS

CROSS REFERENCE TO RELATED APPLICATIONS

This application is a divisional application of Ser. No. 809,808 filed Dec. 16, 1985, now U.S. Pat. No. 4,698,400.

Reference is made to commonly assigned related U.S. application Ser. No. 798,044 entitled "Chip Resistant Primer Composition I", now U.S. Pat. No. 4,708,995; Ser. No. 798,079 entitled "Chip Resistant Primer Composition I'", now U.S. Pat. No. 4,698,399; Ser. No. 798,085 entitled "Chip Resistant Primer Composition I''", now U.S. Pat. No. 4,698,398; and Ser. No. 809,605 entitled "Chip Resistant Primer Composition IV", now U.S. Pat. No. 4,698,402; all to Kordomenos et al.

TECHNICAL FIELD

This invention relates to a novel hydroxy functional epoxy-polyester graft copolymer and to a novel, solvent-based, thermosetting coating composition comprising same. It relates also to such coating composition formulated, for example, as a hot-sprayable, high solids coating composition suitable for use a chip resistant motor vehicle primer adapted for use on body panel areas subject to chipping by stones, gravel and other road debris.

BACKGROUND

Solvent-based coating compositions are known which can be applied to a substrate, for example, by spraying, and then cured by baking the coated substrate at an elevated temperature suitable to drive off the organic solvent and to promote crosslinking reaction. The resulting thermoset coating, if sufficiently humidity and solvent resistant, can provide aesthetic and functional advantages including corrosion protection for the underlying substrate.

Automobile manufacturers, in their efforts to extend the expected life of automobile sheet metal and the like, have directed considerable attention to various processes and compositions designed to result in not only improved corrosion resistance but also improved chip resistance properties. In particular, research and development efforts have recently been directed to obtaining primer compositions which are flexible and chip resistant and which give corrosion protection while exhibiting good humidity and solvent resistance, as well as good intercoat adhesion. New automobile designs and concern about chipping in areas exposed to stones, gravel and other road debris, e.g. rocker panels, have demanded such chip resistant primers which can be applied in reasonable thicknesses by techniques which do not require extensive and expensive process modifications during painting operations. To date available primers, whether high or low solids, have not proven suitable.

In order to overcome the aforementioned chipping problem it has been common to apply relatively thick chip resistant coatings in body panel regions which are inclined to chip, prior to application of still another primer composition. One such chip resistant sealer material which has been employed is a polyvinyl chloride plastisol sealer which has been applied with airless spraygun equipment in thicknesses of about 20 mils in regions subject to high levels of chipping. Problems attendant with such thick coatings are readily apparent. Because of the thickness in the region to which it is applied, these materials present an appearance problem often resulting in waviness and roughness in the final coating on the sheet metal. Often times surface imperfections also result from the fact that a primer is applied over the top of this sealer, with the primer and sealer being cured together. As a result some solvent and plasticizer tend to be driven out of the polyvinyl chloride plastisol and this results in a wavy and rough surface. Still further problems associated with the use of such polyvinyl chloride plastisol sealers and the like involve application technique. Since polyvinyl chloride plastisol sealers and the like must be applied in thicknesses of 20 mils or greater in order to obtain good adhesion, they cannot be feathered down to blend into other regions of the sheet metal which do not require the additional chip protection. Thus, the materials must be applied using a masking technique, whereby those regions which are not to be coated with the sealer material are masked in a separate operation prior to application of sealer. This masking is then removed after the sealer is applied. It would obviously be desirable to eliminate these additional steps in the application of the chip resistant sealer material.

Accordingly, it is a preferred object of this invention to provide a novel solvent based, thermosetting coating composition adapted for use as a chip resistant primer, which primer may be applied in thicknesses of less than 20 mils and which may be feathered in such a manner as to blend with paint in other areas of the substrate which do not require chip resistant coating.

It is a further object of the present invention to provide novel resins suitable for use in solvent-based thermosetting coating compositions. In this regard, it is a particular object of the invention to provide novel, hydroxy functional epoxy-polyester graft copolymer resins which are crosslinkable during cure, on the surface of a substrate.

It is another object of the invention to provide novel coating compositions which comprise crosslinkable hydroxy functional epoxy-polyester graft copolymer and blocked polyisocyanate crosslinking agent and which provide high crosslinking efficiency and tough well cured films at minimum bake temperatures, such as when applied as automotive primers. In this regard, it is a particular object of the invention to provide a novel hydroxy functional epoxy-polyester graft copolymer resin/blocked polyisocyanate thermosetting coating composition of sufficiently low Volatile Organic Content (VOC) to aid in meeting governmental emissions guidelines and yet which can be applied to a substrate by spraying or other known method.

It is still another object of the invention to provide a composition which will form a coating on a substrate, which coating has advantageous physical properties including, for example, humidity and solvent resistance, flexibility and corrosion protrusion for the underlying substrate.

Additional aspects and advantages of the invention will be apparent from the following description thereof.

DISCLOSURE OF THE INVENTION

According to the present invention, novel crosslinkable hydroxy functional epoxy-polyester graft copolymer resins are provided which are adapted for use in thermosetting coating compositions, and which are especially advantageous for use in high solids and chip resistant, organic solvent based thermosetting coating compositions. The hydroxy functional epoxy-polyester graft copolymer resins of the invention preferably have a number average molecular weight ($M_n$) of about 2,000 to about 20,000 and are the reaction product obtained by polymerization of lactone monomers in the presence of hydroxy functional epoxy ester resin precursor. Such precursor preferably has a number average molecular weight ($M_n$) of between about 1,000 and about 4,000 and is the reaction product of diepoxide chain extended with aliphatic diol and subsequently chain terminated with acid component comprising primary hydroxy functional acid.

Also according to the present invention, a novel, organic solvent based, thermosetting composition, in addition to solvent and any pigments and additives such as, for example, catalyst, flow control agents and the like, comprises the hydroxy functional epoxy-polyester graft copolymer resin of the invention and blocked polyisocyanate crosslinking agent including, but not limited to, blocked trifunctional isocyanurate ring containing polyisocyanates and oligoester modified blocked isocyanates.

Particularly preferred compositions of the invention are those formulated as high solids coating compositions having solids levels in the range of 65-80% solids and suitable to be applied as chip resistant primers in those areas of automotive panels, such as rocker panels, which are exposed to high levels of chipping. Such compositions may be applied in thicknesses ranging from about 1 to 25 mils wet to obtain final coatings in the range of 1 to 12 mils dry, and may be feathered down to blend in with paint applied to regions outside that requiring additional chip resistance protection. Generally, the compositions of this solids level may be applied using hot spray equipment at temperatures in the range of from room temperature (i.e., 25° C.) to about 160° F.

Other preferred compositions of the invention are those formulated as high solids coating compositions adapted to be applied by conventional spraying onto a substrate. These high solids coating compositions may have a solids level in the range of 50-60% and are especially useful as a primer coating on the bare, unpolished metal surface of an automotive vehicle. As used herein, a high solids coating composition is one having a volatile organic content of about 479 g/l (4.0 lb./gal.) or less.

Other features and advantages of this invention will become more apparent from the following, detailed description thereof including the preferred embodiments and best mode of carrying out this invention.

DETAILED DESCRIPTION OF THE INVENTION

The novel, hydroxy functional epoxy-polyester graft copolymer preferably has a number average molecular weight ($M_n$) of between about 2,000 and about 20,000 and is formed by polymerization of lactone monomers in the presence of hydroxy functional epoxy ester resin precursor preferably having a number average molecular weight ($M_n$) of between about 1,000 and about 4,000. The hydroxy functional epoxy ester resin precursor is the reaction product of diepoxide chain extended with aliphatic diol and subsequently chain terminated with acid component comprising primary hydroxy functional acid. The polymerization of lactone monomers with the precursor is generally carried out at a temperature between about 50° C. and about 300° C., preferably at a temperature between about 130° C. and about 200° C., and the polymerization reaction mixture comprises between about 10 and about 80 weight percent hydroxy functional epoxy ester resin precursor and between about 90 and about 20 weight percent lactone monomers. Preferably, the polymerization reaction mixture comprises between about 35 and about 65 weight percent hydroxy functional epoxy ester resin precursor and between about 65 and 35 weight percent lactone monomers.

Thermosetting compositions of the invention comprise the above hydroxy functional graft copolymer and blocked polyisocyanate crosslinking agent comprising at least one isocyanate group which has been blocked by reaction with an active hydrogen bearing blocking agent. The blocked polyisocyanate crosslinking agent is included in the composition in an amount such that upon deblocking of the blocked isocyanate groups thereof at the cure temperature of the composition, the crosslinking agent provides between about 0.5 and about 1.6 reactive isocyanate groups per reactive group on the hydroxy functional epoxy-polyester graft copolymer.

Each of the above major components of the compositions as well as other components and other aspects of the invention are described hereinafter in greater detail.

A.

HYDROXY FUNCTIONAL EPOXY-POLYESTER GRAFT COPOLYMER

As described above, this copolymer is prepared by polymerizing lactone monomer in the presence of a hydroxy functional epoxy ester resin precursor which itself is the reaction product of diepoxide chain extended with aliphatic diol and subsequently chain terminated with acid component comprising primary hydroxy functional acid.

It is believed to be a significant characterizing aspect of the hydroxy functional epoxy-polyester graft copolymer of the invention that the polymerized lactone portion of the epoxy-polyester graft copolymer gives the polymer flexibility as well as toughness, two key properties when choosing a primer for use in areas susceptible to chipping. It is a further characterizing aspect of the copolymer that it includes epoxy resin portions, i.e. hydroxyl terminated epoxy ester resin precursor is used as an initiator to form the graft copolymer, which give the copolymer excellent corrosion resistance properties. Still further, because the graft copolymers of the invention are branched, they require a minimum amount of crosslinking in order to obtain a suitable network for good coating integrity. Since crosslink bonds, e.g. isocyanate bonds as used in compositions of the invention, tend to be somewhat brittle, it is desirable to have a minimum number of such bonds.

Preferred hydroxy functional epoxy-polyester graft copolymers of the invention include significant aromatic content which is believed to enhance corrosion resistance properties. Even though aromatics tend to increase the brittleness of polymers and compositions including such polymers, it is possible to include them since, as mentioned above, the polymerized lactone portion of the hydroxy functional epoxy-polyester graft copolymer gives the polymer increased flexibility which more than compensates for any such brittleness. A particularly preferred embodiment of the hydroxy functional epoxy-polyester graft copolymer resin of the invention is prepared from aromatic-containing diepoxide.

Each of the reactants employed in the preparation of the epoxy-polyester graft copolymer is described in greater detail below.

(i) Diepoxide Reactant

The diepoxide reactant suitable for preparing the epoxy ester resin precursor can be any of numerous diepoxides, including diphenol chain extended diepoxides, many of which are commercially available and which will be apparent to the skilled of the art in view of the present disclosure. While, ultimately, the choice of the epoxy reactant for preparing the epoxy ester precursor resin will depend to an extent upon the particular application intended for the coating composition, terminal diepoxides, that is diepoxides bearing two terminal epoxide groups, are generally most preferred. These are generally more reactive and therefore require reaction conditions under which undesirable side reactions, for example, epoxy-epoxy reactions and gelation, can be more easily avoided.

Diepoxy resins, not previously extended with diphenol, may be used in the preparation of the epoxy ester resin precursor. Preferred diepoxy resins of this type include Epon 828 (trademark) and Epon 829 (trademark) which are nonextended diepoxides of the Epon (trademark) series (Shell Chemical Company, Houston, Texas), as well as cycloaliphatic diepoxy resins such as: the Eponex (trademark) series (Shell Chemical Company); hydantoin epoxy resins such as, for example, Resin XB2793 (trademark; Ciba-Geigy Corporation, Ardsley, N.Y.); and any of a wide variety of acyclic or cyclic aliphatic diepoxides such as, for example, 1,4-butanediol diglycidyl ether and 4-vinylcyclohexene dioxide and the like. Other suitable diepoxides are available and will be apparent to the skilled of the art in view of the present disclosure.

Still further, diepoxides previously extended with diphenol may be employed in forming the precursor and numerous such extended diepoxides are known and are commercially available. These include certain of the well known bisphenol-A epichlorohydrin epoxy resins of the Epon (trademark) series (Shell Chemical Company), e.g., Epon 1001 and Epon 1004, and the DER (trademark) series (Dow Chemical Company, Midland, Mich.), e.g., DER 332. These diglycidyl ether bisphenol-A resins or higher molecular weight analogs thereof, are preferred in view of their cost and commercial availability. Any of the commercially available diphenol extended epoxy resins such as those discussed above may be further extended, if desired, by diphenol in order to give higher molecular weight materials having desirable properties. Also, it will be understood from the foregoing that any mixture of compatible diepoxides may be used.

In addition to the diepoxide, a portion of the epoxy functionality can be provided by any compatible monoepoxy compound or polyepoxy compound or mixture of such compounds. The polyepoxide can be any of the well known types such as polyglycidyl ethers of polyphenols. These can be produced by etherification of polyphenol and epihalohydrin in the presence of alkali. It will be recognized by the skilled of the art in view of the present disclosure, that in some instances, particularly where a coating composition of high solids content is less important, it may be desirable to incorporate polyepoxide of higher molecular weight. Preferably, any such polyepoxide contains free hydroxyl groups in addition to epoxide groups.

While polyglycidyl ethers of polyphenol can be employed, it may be desirable to react a portion of the reactive sites (hydroxyl or in some instances epoxy) with a modifying material to vary the film characteristics of the resin. The epoxy resin may be modified, for example, with isocyanate group containing organic materials or other reactive organic materials.

Other useful polyepoxide are the novolak resins including, for example, the novolak epoxy resins ECN 1235 (trademark) and ECN 1273 (trademark), Ciba-Geigy Corporation.

According to preferred embodiments of the present invention, epoxide compounds other than diepoxide compounds provide no more than about 15% and most preferably substantially none of the total epoxide functionality in the reactants used to form the epoxy-ester resin.

(ii) Aliphatic Diol Reactant

The aliphatic diol reactants suitable for reaction with the diepoxide reactant in chain extension reaction include numerous commercially available materials, many of which will be readily apparent to the skilled of the art in view of the present disclosure. Preferred aliphatic diols have the general formula (I):

$$OH-R-OH \qquad (I)$$

when R is a divalent, aliphatic linking moiety substantially unreactive with the diepoxide resin, for example, $(CH_2)_n$ wherein n is preferably from 1 to about 8, and the like. Both saturated and unsaturated aliphatic diols are suitable. Inorganic moieties, for example sulfonyl and the like, also are suitable. Diols of this character provide good reactivity with diepoxides described above and provide, ultimately, cured coatings of the invention having excellent physical properties, most notably excellent corrosion protection. It will be apparent to the skilled of the art in view of the present disclosure that R should be substantially unreactive with the diepoxide and the acid component employed in preparation of the hydroxy functional epoxy ester precursor.

Preferably the diol has a number average molecular weight ($M_n$) between about 60 and about 500, more preferably between about 60 and about 200. Particularly preferred diols include those according to formula (I) above, wherein R is selected from the group consisting of a straight or branched alkylene or alkylidene moiety of one to about 10 carbons, preferably having three to four carbons. Most preferred are terminal diols, that is, diols bearing two terminal hydroxy functionality, for example, 1,6-hexanediol, since these generally are more reactive. Other suitable aliphatic diols include primary/secondary and secondary/secondary carbon hydroxy substituted diols. Diols bearing tertiary hydroxyl groups are least preferred due to their lower reactivity. Thus, preferred diols include, for example, alkyl substituted or unsubstituted propanediol, butanediol, pentanediol, hexanediol, and a mixture of any of them. Preferred aliphatic diols include, aliphatic diols of about 2 to 20 carbons, for example, ethylene glycol, 1,3-propanediol, 1,4-butanediol, 1,5-pentanediol, 3-ethyl-1,3-hexanediol and the like, or a compatible mixture of any of them. Other suitable aliphatic diols for forming the epoxy ester resin precursor of the present invention will be apparent to the skilled of the art in view of the present disclosure.

Preferably, the chain extended diepoxide to be chain terminated with the acid component has a number average molecular weight ($M_n$) between about 1,200 and about 3,500, and more preferably between about 1,600 and about 2,400.

(iii) Acid Component Reactant

The acid component comprises primary hydroxy functional acid. Numerous suitable primary hydroxy functional acids will be apparent to the skilled of the art in view of the present disclosure, including many which are readily commercially available. These include $C_3$-$C_{26}$ primary hydroxy functional acids, wherein the acid contains one carboxyl group and one or more hydroxyl groups (at least one of which is a primary hydroxy group) and no other functional groups which would react substantially with the chain-extension reaction product. Preferred primary hydroxy functional acids correspond to the general chemical formula:

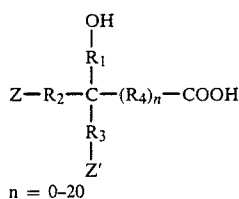

$$n = 0\text{-}20$$

wherein $R_1$, $R_2$, $R_3$ and $R_4$ are the same or different and each preferably is lower alkylene such as methylene or ethylene, and Z and Z' are selected independently from hydrogen, hydroxyl, and any other non-interfering functionality such as nitrile ester group, halogen, amide, etc. Suitable hydroxy acids which may be employed in the chain terminating reaction include, but are not limited to, dimethylol propionic acid which is most preferred, bis(hydroxy ethyl) propionic acid, bis(hydroxy propyl) propionic acid, and a compatible mixture of any of them. Preferably, the primary hydroxy acid contains two or more hydroxyl groups, e.g., at least one of Z and Z' contains a hydroxyl group.

Optionally, the acid component may further comprise fatty acid. Suitable fatty acids include numerous commercially available fatty acids such as, for example, those derived from or contained in either animal or vegetable fat or oil. Preferred are fatty acids from about 8 to about 18 carbons, since these are found to provide flexibility to the cured coating. Also preferred among the fatty acids are the more saturated fatty acids, since it appears that olefinic unsaturation in the fatty acid can undergo a polymerization-type reaction between such double bonds during the synthesis of the epoxy ester resin of the invention. Unsaturated fatty acids are suitable for use, however, such as, for example, oleic acid, linoleic, linolenic and the like and mixtures of such acids, and can be used together with a suitable inhibitor for the polymerization-type reaction, such as hydroquinone or the like, of which many are commercially available and will be apparent to the skilled of the art in view of the present disclosure. In addition, aromatic fatty acids are commercially available and can be employed. Preferred for use are the substantially saturated fatty acids such as Soya fatty acid which is most preferred, and butyric, lauric, palmitic and stearic fatty acids and the like or a compatible mixture of any of them. These are relatively inexpensive and have been found to provide good reactivity with the preferred diepoxides described above. For convenience of use, the fatty acids which are semisolid or liquid at room temperature are generally preferred over the solid fatty acids.

The hydroxy functional epoxy ester resin precursor used to initiate lactone polymerization in the preparation of the epoxy-polyester graft copolymer of the invention can be made according to techniques well known to the skilled of the art. The chain extension, where necessary, and chain termination reactions are carried out sequentially, with the chain extension of the diepoxide being carried out first. Accordingly, diepoxide and alphatic diol are charged into a suitable reactor and heated. The reactants are used in relative proportions to yield a chain extension reaction product bearing two unreacted epoxy groups and preferably substantially no unreacted diol. Suitable separation techniques are known to the skilled of the art for removal of unused reactants. It should be recognized that to assure rapid and/or more complete reaction of the diepoxide with the diol, it is usually preferred to have a catalyst present. The use of catalyst has been found to be advantageous in the preparation of the epoxy ester resin. Epon 829 (trademark), mentioned above, as sold, provides a proprietary catalyst. Epon 828 (trademark), is substantially the same but does not provide such catalyst. Suitable catalysts are commercially available and include any of the well known catalysts for epoxy-hydroxy reaction such as, for example, sodium carbonate, lithium neodecanoate and other organo metallic catalysts and tertiary amines, such as benzyl diemthylamine, which is preferred. Still other preferred catalyst include formylmethylene triphenylphorane, formylmethyltriphenylphosphonium chloride, methyltriphenylphosphonium iodide, and ethyltriphenyl phosphonium acetate. Other suitable catalysts will be apparent to those skilled in the art in view of the present disclosure.

The reaction mixture is heated to at least about 135° C. (280° F.) at which point, in the presence of catalyst, exothermic reaction will proceed with or without further heating. Typically, the reaction mixture will then reach about 170° C.-190° C. (340° F.-370° F.), depending upon the batch size and reactor vessel insulation, etc. In the absence of catalyst, such exotherm is typically not observed and continued heating is required. The progress of the reaction can be followed by measuring acid number and/or weight per epoxy (WPE), i.e., epoxy equivalent weight.

After completion of the chain extension reaction of diepoxide with diol, the diepoxide reaction product is reacted with the acid component in chain terminating reaction in approximately 1 to 1 equivalent ratio. This ratio is preferred since excess epoxy could result in gelation of the reaction mixture, while excess acid component remaining in the reaction mixture could compete with the epoxy ester resin precursor for lactone monomers during formation of the epoxy-polyester graft copolymer. For this reason, if excess acid component is used during formation of the precursor, it should preferably be removed prior to reaction of the precursor with the lactone monomers.

(iv) Lactone Monomers

The lactone reactant may be any lactone, or combination of lactones, having at least six carbon atoms, for example, from six to eight carbon atoms, in the ring and at least one hydrogen substituent on the carbon atom which is attached to the oxy group in said ring. In one aspect, the lactone used as a reactant can be represented by the general formula:

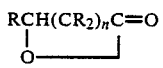

in which n is at least four, for example, from four to six, at least n+2 R's are hydrogen, and the remaining R's are substituents selected from the group consisting of hydrogen, alkyl, cycloalkyl, alkoxy and single ring aromatic hydrocarbon radicals. Lactones having greater numbers of substituents other than hydrogen on the ring, and lactones having five or less carbon atoms in the ring, are considered unsuitable for the purposes of the invention because of the tendency that polymers thereof have to revert to the monomer, particularly at elevated temperature.

The lactones preferred in this invention are the epsilon-caprolactones having the general formula:

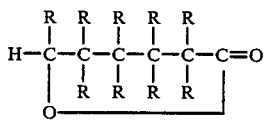

wherein at least six of the R's are hydrogen and the remainder are hydrogen, alkyl, cycloalkyl, alkoxy or single ring aromatic hydrocarbon radicals, none of the substituents contain more than about twelve carbon atoms, and the total number of carbon atoms in the substituents on a lactone ring does not exceed about twelve. Unsubstituted epsilon-caprolactone, in which all the R's are hydrogen, is derived from 6 hydroxyhexanoic acid and is most preferred. Substituted epsilon-caprolactones, and mixtures thereof, are available by reacting a corresponding substituted cyclohexanone with an oxidizing agent such as peracetic acid.

Among the substituted epsilon-caprolactones considered most suitable for the purposes of the invention are the various monoalkyl epsilon-caprolactones such as the monomethyl-, monoethyl-, monopropyl-, monoisopropyl-, etc. to monododecyl epsilon-caprolactones; dialkyl epsilon-caprolactones in which the two alkyl groups are substituted on the same or different carbon atoms, but not both on the epsilon carbon atom; trialkyl epsilon-caprolactones in which two or three carbon atoms in the lactone ring are substituted, so long as the epsilon carbon atom is not disubstituted; alkoxy epsilon-caprolactones such as methoxy and ethyoxy epsilon-caprolactones; and cycloalkyl, aryl, and aralkyl epsilon-caprolactones such as cyclohexyl, phenyl and benzyl epsilon-caprolactones.

Lactones having more than six carbon atoms in the ring, e.g., zeta-enatholactone and eta-caprylolactone may also be polymerized in accordance with the invention.

Polymerization of the lactones in accordance with this invention is carried out in conventional manner. While not wishing to be bound by theory, it currently is understood that the polymerization is initiated by reaction with a compound having at least one reactive hydrogen, with or without the aid of a catalyst, by opening the lactone ring and adding it as an open chain without forming water of condensation—in this case the initiator compound being the hydroxy functional epoxy ester precursor described above. The polymerization reaction mixture comprises between about 10 and about 80 weight percent of the above-described hydroxy functional epoxy ester resin and between about 10 and about 20 weight percent of the lactone monomers. Preferably, the polymerization reaction mixture comprises between about 35 and about 65 weight percent of the hydroxy functional epoxy ester resin and between about 65 and about 35 weight percent of the lactone monomers.

To initiate and continue the polymerization of the lactone, the lactone and the initiator (i.e., the precursor) are preferably heated to a temperature between about 130° and 200° C. to achieve a practical and desirable rate of reaction with a minimum of decomposition. The temperature may be considerably lower however, i.e., as low as about 50° C. at the sacrifice of speed of reaction. It may also be considerably higher, i.e., up to about 300° C., although care must be taken at such higher temperatures because of the more likely losses, at temperatures above 250° C., due to decomposition or undesirable side reactions. Generally, therefore, a temperature range of 50° C. to 300° C. is considered operable and a more limited range between about 130° and 200° C. is considered preferably.

The polymerization may be, and preferably is, carried out with the use of a catalyst, such as a basic or neutral ester interchange catalyst, to accelerate the reacton. Among catalysts suitable for this purpose are such metals as lithium, sodium, potassium, rubidium, cesium, magnesium, calcium, barium, strontium, zinc, aluminum, titanium, cobalt, germanium, tin, lead, antimony, arsenic and cerium, as well as the alkoxides thereof. Additional suitable catalysts are, by way of example, the carbonates of alkali- and alkaline earth metals, zinc borate, lead borate, zinc oxide, lead silicate, lead arsenate, litharge, lead carbonate, antimony trioxide, germanium, dioxide, cerium trioxide, cobaltous acetate and aluminum isopropoxide. Catalyst concentrations between about 0.001 and 0.5%, based on the weight of the starting lactones, are suitable. The preferred range is from 0.01 to 0.2%.

The hydroxy functional epoxy-polyester graft copolymerization products obtained in accordance with the invention have molecular weights generally upwards of about 2,000 and preferably within the range of about 4,000 to about 20,000, although molecular weights below and substantially above this range are obtainable if desired. While not wishing to be bound by theory, it presently is understood that the hydroxy functional epoxy-polyester graft copolymer has reactive terminal hydroxyl groups, the number of reactive terminal groups depending upon the functionality of the initiator. Further, it presently is understood that they are characterized by the presence of series of interconnected, substantially linear units or groups composed of carbon, hydrogen and oxygen. The interconnected units are opened lactone residues each having a terminal oxy group at one end, a carbonyl group at the other end, an intermediate chain of at least five carbon atoms and at least one hydrogen substituent on the carbon atom in the intermediate chain that is attached to the terminal oxy group. The oxy group of one lactone residue is connected to the carbonyl group of an adjacent lactone residue in the series and the oxy group of the last lactone residue in a series is connected to a hydrogen to form a terminal hydroxyl group at one end of the series.

B.

CROSSLINKING AGENT

The crosslinking agent employed in the novel solvent based coating compositions of the invention comprises blocked polyisocyanate. The novel solvent based coating compositions of the invention, as a result of employing blocked polyisocyanate crosslinking agents, exhibit exceptional shelf stability even when corrosion inhibiting pigments such as zinc chromate are used in high concentrations.

As used herein "blocked polyisocyanate" means an isocyanate compound containing two or more isocyanato groups, all of which have been reacted with a material which will prevent reaction of the isocyanate group at room temperature with compounds that conventionally react with such groups, and at least some of which will permit that reaction to occur at higher (cure) temperatures. In general the blocked polyisocyanate may be prepared by reacting a sufficient quantity of an active hydrogen containing blocking agent with the polyisocyanate to insure that no free isocyanato groups are present. The blocking agent may be represented by the formula BH and may be selected from numerous materials, hereinafter discussed, which bear an active hydrogen.

The blocked polyisocyanate crosslinking agent is included in compositions of the invention in amounts such that upon deblocking of the blocked isocyanato groups at the cure temperature of the composition, the crosslinking agent will provide between about 0.5 and about 1.6, preferably between about 0.8 and about 1.3, reactive isocyanato groups per reactive group on the film forming graft copolymer of the coating composition as described above. Blocked polyisocyanates of numerous types may be employed in the compositions of the invention. Particularly suitable blocked polyisocyanates, which will be discussed further hereinafter, include blocked polymethylene polyphenol isocyanates, isocyanurate ring containing blocked polyisocyanates and certain oligoester modified blocked polyisocyanates.

In the preparation of the blocked polyisocyanate crosslinking agent, any suitable organic polyisocyanate may be used. Representative examples are the aliphatic compounds such as trimethylene, tetramethylene, pentamethylene, hexamethylene, 1,2-propylene, 1,2-butylene, 2,3-butylene, 1,3-butylene, ethylidine and butylidene diisocyanates; the cycloalkylene compounds such as 1,3-cyclopentane, 1,4-cyclohexane, and 1,2-cyclohexane diisocyanates; the aromatic compounds such as m-phenylene, p-phenylene, 4,4'-diphenyl, 1,5-napthalene, and 1,4-napthalene diisocyanates, the aliphatic-aromatic compounds such as 4,4'-diphenylene methane, 2,4- or 2,6-tolylene, or mixtures thereof, 4,4'-toluidine, and 1,4-xylylene diisocyanates; substituted aromatic compounds such as dianisidine diisocyanate, 4,4'-diphenylether diisocyanate and chlorodiphenylene diisocyanate; the triisocyanates such as triphenyl methane-4,4'4"-triisocyanate, 1,3,5-triisocyanate benzene and 2,4,6-triisocyanate toluene; the tetraisocyanates such as 4,4'-diphenyl-dimethyl methane-2,2', 5,5'-tetraisocyanate; and the polymerized polyisocyanates such as tolylene diisocyanate dimers and trimers, and the like.

In addition, the organic polyisocyanate may be a prepolymer derived from a polyol including polyether polyol or polyester polyol, including polyethers which are reacted with excess polyisocyanates to form isocyanate-terminated prepolymers. The polyols may be simple polyols such as glycols, e.g., ethylene glycol and propylene glycol, as well as other polyols such as glycerol; trimethylolpropane, pentaerythritol, and the like, as well as mono-ethers such as diethylene glycol, tripropylene glycol and the like and polyethers, i.e., alkylene oxide condensates of the above. Among the alkylene oxides that may be condensed with these polyols to form polyethers are ethylene oxide, propylene oxide, butylene oxide, styrene oxide and the like. These are generally called hydroxyl-terminated polyethers and can be linear or branched. Examples of polyethers include polyoxyethylene glycol, polyoxypropylene glycol, polyoxytetramethylene glycol, polyoxyhexamethylene glycol, polyoxynonamethylene glycol, polyoxydecamethylene glycol, polyoxydodecamethylene glycol and mixtures thereof. Other types of polyoxyalkylene glycol ethers can be used. Especially useful polyethers polyols are those derived from reacting polyols such as ethylene glycol, diethylene glycol, triethylene glycol, 1,4-butylene glycol, 1,3-butylene glycol, 1,6-hexanediol, and their mixtures; glycerol, trimethylolethane, trimethylolpropane, 1,2,6-hexanetriol, pentaerythritol, dipentaerythritol, triphentaerthritol, polypentaerythritol, sorbitol, methyl glucosides, sucrose and the like with alkylene oxides such as ethylene oxide, propylene oxide, their mixtures, and the like.

A particular class of aromatic polyisocyanates which may be employed in the novel solvent based coating compositions of the invention are polymethylene polyphenol isocyanates having the formula:

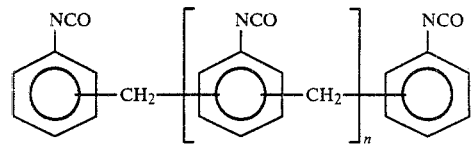

wherein n equals 1 to 3. Such compounds, sold under the tradename "PAPI" by the UpJohn Chemical Company of Kalamazoo, Mich., have proven to be particularly useful in compositions of the invention, resulting in compositions exhibiting desirable toughness in the final cured coating.

The active hydrogen containing blocking agents which are reacted with the above described organic diisocyanates may be selected from numerous blocking agents which will be apparent to those skilled in this art. Representative of those blocking agents which are preferred are those selected from the group consisting of (i) aliphatic, cycloaliphatic and aromatic alkyl monoalcohols; (ii) hydroxyl amines; (iii) oximes; (iv) lactams; and (v) triazoles. Any suitable aliphatic, cycloaliphatic or aromatic alkyl monoalcohol may be used as a blocking agent in accordance with the present invention. For example, aliphatic alcohols, such as methyl, ethyl, chloroethyl, propyl, butyl, amyl, hexyl, heptyl, octyl, nonyl, 3,3,5-trimethylhexyl, decyl, and lauryl alcohols, and the like may be employed. Suitable cycloaliphatic alcohols include, for example, cyclopentanol, cyclohexanol and the like, while aromatic-alkyl alcohols include phenylcarbinol, methylphenylcarbinol, and the like. Minor amounts of even higher molecular weight relatively non-volatile monoalcohols may be used, if desired, to serve as plasticizers in the coatings provided by the invention. Examples of hydroxyl amines which may be employed as blocking agents include ethanol amine and propanol amine. Suitable oxime blocking agents include, for example, methylethylketone oxime, acetone oxime and cyclohexanone oxime. Examples of lactams which may be used as blocking agents are caprolactam, butyrolactam and pyrrolidone, while suitable triazoles include compounds such as 1,2,4-triazole, 1,2,3-benzotriazole, 1,2,3-tolytriazole and 4,5-diphenyl-1,2,3-triazole. Particularly preferred active hydrogen containing blocking agents are methylethyl ketoxime and 2-ethylhexanol.

(i) Isocyanurate Ring Containing Blocked Isocyanate Compounds

Within the scope of the above general class of blocked polyisocyanate crosslinking agents, a particular class type of blocked polyisocyanate crosslinking agent which may be employed in the novel solvent based coating compositions of the invention comprises isoycanurate ring containing blocked isocyanate compounds. In general, these blocked polyisocyanates may be formed by blocking with the aforementioned blocking agent isocyanurate ring containing polyisocyanates. These compounds may be formed by cyclotrimerization of difunctional isocyanates. Usually, the reaction does not stop in this stage and continues through the formation of polyfunctional oligomers or a mixture of such oligomers with a portion of the pure trifunctional polyisocyanate. Mixtures of trifunctional product and various polyfunctional oligomers are commercially available.

A particularly desirable blocked polyisocyanate crosslinking agent is the blocked form of the pure trifunctional isocyanurate represented by the following formula:

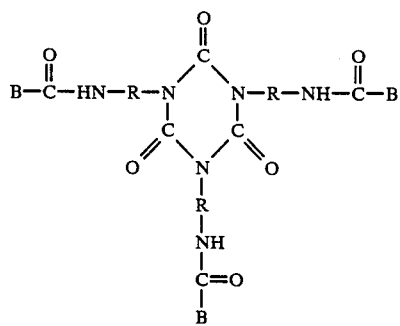

wherein R is selected from the group consisting of aliphatic, cycloaliphatic and aromatic groups and combinations thereof and B is the residue of an active hydrogen containing blocking agent. More specifically, this compound if disclosed in U.S. Pat. No. 4,491,663, the disclosure of which is hereby incorporated by reference.

(ii) Oligoester Modified Blocked Polyisocyanates

Still further particular blocked polyisocyanates useful as crosslinking agents in the novel solvent based coating compositions of this invention are oligoester modified blocked polyisocyanates prepared from a particular class of oligoester diols and triols. A first type of such oligoester modified blocked polyisocyanates is prepared from organic diisocyanates bearing one isocyanato group more reactive than the other, with the more reactive isocyanato first being blocked with a blocking agent and the remaining isocyanato group then being reacted with hydroxyl functionality of an oligoester diol or triol as referred to above. The second type of oligoester modified blocked polyisocyanate may be prepared by reacting oligoester diols from the aforementioned class of oligoesters with an excess of organic diisocyanate so as to form an isocyanato terminated prepolymer followed by blocking of the terminal isocyanato groups of the prepolymer with an active hydrogen containing blocking agent. Each of these materials is particularly useful in the composition of the invention and produces final cured coating compositions exhibiting outstanding flexibility.

Oligoesters of the type employed in the preparation of these crosslinking agents are described in U.S. Pat. No. 4,322,508 issued Mar. 30, 1982, the disclosure of which is hereby incorporated by reference. The hydroxy functional oligoesters within the useful class of materials (i) have a number average molecular weight ($M_n$) of between about 150 and about 3000, preferably between about 230 and about 1000, (ii) bear 2 or 3 hydroxyl groups per molecule, and (iii) are formed by an esterification reaction between a carboxylic acid and an epoxide. The esterification reaction products are selected from the group consisting of:

(a) the esterification reaction product of polycarboxylic acid, i.e., carboxylic acid bearing 2 or more carboxyl groups, and monoepoxide;

(b) the esterification reaction product of polyepoxide, i.e., a compound having 2 or more (c) the esterification reaction product of hydroxy functional carboxylic acid and mono- or polyepoxide, preferably monoepoxide;

(d) the esterification reaction product of monocarboxylic acid and hydroxy functional mono- or polyepoxide, preferably monoepoxide; and (e) mixtures of (a)-(d).

As noted above, the first type of aligoester modified blocked polyisocyanate crosslinking agent is prepared by (i) reacting organic diisocyanate bearing one isocyanato group which is more reactive than the other with a sufficient amount of an active hydrogen containing blocking agent to react substantially with all of the more reactive isocyanate groups, thus providing a half-blocked diisocyanate and (ii) reacting this half-blocked intermediate with the above discussed oligoester. The organic diisocyanates employed in this synthesis, as well as the active hdyrogen containing blocking agents, are discussed above in connection with the preparation of the isocyanurate ring containing blocked isocyanate crosslinking agents useful in compositions of the invention. The organic polyisocyanate-blocking agent adduct intermediate is formed by reacting a sufficient quantity of the blocking agent with the organic diisocyanate to insure that one of the two —NCO groups on the diisocyanate is reacted. The reaction between the organic diisocyanate and the blocking agent is exothermic; therefore, the diisocyanate and the blocking agent are preferably admixed at temperatures no higher than about 80° C., preferably below about 50° C., to minimize the exothermic effect. and the blocking agent are preferably admixed at temperatures no higher than about 80° C., preferably below about 50° C., to minimize the exothermic effect.

This intermediate is next reacted with the oligoester diol or triol described above so as to react substantially all free or unblocked isocyanato groups of the diisocyanate/blocking agent intermediate with hydroxyl groups of the oligoester. This reaction is carried out desirably at a temperature of about 80°–120° C.

As also discussed above, the second type of oligoester modified blocked polyisocyanate crosslinking agent useful in the novel solvent based coating compositions of the invention is prepared by reacting an excess of organic diisocyanate with an oligoester diol from the above described class of oligoesters followed by reaction of the terminal isocyanato groups formed on the resultant prepolymer with an active hydrogen containing blocking agent as described above so as to react with substantially all the isocyanato groups. The diisocyanate starting material is used in excess in amounts sufficient to insure that the intermediate is isocyanate terminated. Therefore, it is preferable that the organic diisocyanates and the dihydroxy functional oligoester be reacted in a molar ratio of from greater than 1:1 up to 2:1. Numerous diisocyanates of the type described hereinbefore may be employed in the preparation of this intermediate. While it is not necessary that one isocyanato group be more reactive than the other, the preparation of this type of crosslinking agent does not preclude the use of such material.

C.
GENERAL DISCUSSION—OTHER ASPECTS OF INVENTION AND OTHER COMPONENTS

The coating compositions of the invention have been found to provide a cured coating having the advantageous physical properties described above, over a wide range of cure temperatures and a wide range of solids levels. More specifically, the coating compositions according to preferred embodiments of the invention have been found to cure at temperatures from as low as about 120° C. or less within about 15 minutes or less, and yet to cure and suffer no significant loss of advantageous physical properties at temperatures as high as about 200° C. or more for periods up to about 60 minutes or more. Considered together with the storage stability of the coating composition, it can be readily recognized that the present invention provides a highly significant advance in the coating composition art.

It will be within the skill of the art to determine the proper volatile organic content for a given composition of the invention and for a given application. For compositions to be used as spray-applied coating compositions, preferred solvents have relatively low volatility at temperatures appreciably below their boiling points such that solvent evaporation is low during storage and/or application of the coating composition to the substrate. A suitable solvent system may include, for example, toluene, methyl ethyl ketone, isobutyl acetate, xylene, cellosolve acetate, acetone and a mixture of any of them. Other solvents which may be employed include terpenes, aliphatic and aromatic naphthas, and the like. Additional suitable solvents are commercially available and will be apparent to the skilled of the art in view of the present disclosure.

Any solvent allowed to remain in the cured coating should be inert so as to avoid adverse effect upon the cured coating or upon another coating layer used in conjunction with it during the curing process or thereafter. Preferably, the cured coating is substantially free of solvent.

Sufficient solvent is used to reduce the viscosity of the coating composition to a level suitable for application to the substrate in the desired manner. In those cases where the composition is to be applied as a chip resistant primer, the amount of solvent will be reduced so as to give a solids level of about 65–80%. Such higher solids materials are generally applied using hot spray equipment.

Flow control agent(s), for example, polybutyl acrylate; wetting agent(s), for example, silicone; pigments; pigment dispersants; corrosion inhibitors, for example, chormate pigments, numerous of all of which are known to the skilled of the art, may be employed in the coating compositions of the invention. In addition, suitable reactive additives can be used, including, for example, low molecular weight diol flow control agents and reactive diluents.

Compositions of the invention, and in particular the chip resistant primers of the invention, may also include anti-settling or anti-sagging agents to control the thixotropic properties of the composition. Exemplary of available materials suitable for this purpose are Dislon (trademark) 6900-20X manufactured by Kusumoto Chemicals, Ltd., Tokyo, Japan and sold by King Industries, Norwalk, CT 06852; Bentone (trademark) 38, N.L. Industries, Highstown, N.J. 08520; and Cab-O-Sil (trademark) M-5, Cabot Corporation.

Curing the coating composition requires baking for sufficient time at sufficiently elevated temperature to react the crosslinking agent with the hydroxyl functionality of the hydroxy functional epoxy-polyester graft copolymer. The time and temperature required to cure the coating are interrelated and depend upon the particular hydroxy functionality epoxy-polyester graft copolymer resin, crosslinking agent, solvent and other materials, if any, and the amount of each comprising the coating composition. The coating compositions according to preferred embodiments of the invention, as described above, have been found to provide the best coating results when currred at about 150° C. (300° F.) for 20 minutes. It is a highly signifcnt advantage of the invention, however, that these same coating compositions can withstand, for example, temperatures as high as about 200° C. (390° F.) for periods of time as long as about 60 minutes. Accordingly, great flexibility is provided in both designing and implementing a curing schedule for parts coated with the coating compositions of the invention. Thus, in the assembly of automotive vehicles, for example, vehicles unavoidably held in a curing oven for long periods of time during unplanned assembly line shut-downs are recovered with cured and unharmed coatings.

High solids coating compositions according to the present invention, comprising the novel crosslinkable hydroxy functional epoxy-polyester graft copolymer resins of the invention, especially the preferred resins described above and blocked polyisocyanate crosslinking agent, especially the preferred materials described above, have been found to afford cured coatings with improved corrosion resistance and chip resistance, thus representing a highly advantageous advance in the art.

A most preferred use of the coating composition of the invention is as a high solids hot sprayable chip resistant prime for use on a bare metal substrate such as for an automotive vehicle body which is subject to chipping. Primer compositions typically are pigmented and any pigments commonly included in primer compositions for metal substrates and acrylic dispersion topcoats such as, for example, carbon black, iron oxide, lithopone, magnesium, silicate, silica, barium sulfate, $TiO_2$, chrome yellow, calcium chromate, strontium chromate, zinc potassium chromate any the like may be used. The primer can be pigmented according to known methods including, for example, by grinding pigments in a portion of the curable resin and adding to the primer composition.

The pigment-to-binder ratio of the chip resistant primer may be from about 0.5/1 to about 2/1 by weight, respectively. It is preferred, however, to use a primer having a pigment-to-binder ratio of from about 1:1 to about 1.5:1 by weight, respectively.

In preferred embodiments of this invention pigments and thixotropic agents desirably are dispersed with epoxy ester resins which do not have an elastomeric component as does the hydroxy functional epoxy-polyester graft copolymer employed as the primary film forming resin of the compositions of this invention. It has been found that, in addition to being very effective dispersing agents for the preparation of pigment millbases and thioxtropic dispersions, non-elastomeric epoxies give the compositions toughness. One type of epoxy useful for this purpose comprises the reaction product of diepoxide, dimer acid and a mixture of soya fatty acid and propionic acid (see Example 1). Other epoxy ester resins useful for this purpose are those disclosed in United States patent application Ser. Nos. 448,886 filed June 14, 1982 (abandoned), and 431,465 filed Sept. 30, 1982 (abandoned), and in U.S. Pat. No. 4,491,641, all assigned to the assignee of this application. These resins comprise the simultaneous reaction product of diepoxide with (i) diphenol, dicarboxylic acid or a mixture of them in chain extension reaction and (ii) fatty acid in chain terminating esterification reaction. Still other suitable epoxy resins useful for dispersing pigment and thioxtropic agents will be apparent to the skilled of the art in view of the present disclosure.

No special expedients are necessary in formulating the primer compositions of this invention. For example, they may be prepared simply by incorporating the resinous components in a suitable solvent system. Thus, for example, by suitable mixing or agitation, each resinous component may be dissolved in a solvent and the resulting solutions combined to form finished primer compositions.

The solvent system may be any suitable combination of organic solvents as described above. For a high solids, hot sprayable, automotive vehicle chip resistant primer, the solvent will comprise preferably about 20 to about 40 percent by weight of the total coating compositions, although of course, larger or smaller amounts may be utilized depending upon the solids content desired.

The primer is generally maintained at about 65 to about 80 percent solids content for hot spraying purposes with conventional thinners such as aromatic hydrocarbons, commercial petroleum cuts which are essentially aromatic, and the like, and sprayed onto the metal base or other substrate and cured. The primer may be applied in greater thickness of 1 to 25 mils wet, preferably 10 to 25 mils wet, in order to obtain final coatings in the desired range of 5–11 mils dry in regions highly susceptible to chipping and is then feathered down in thickness to the thickness of paints in areas not receiving a chip resistant primer. The primer is cured at elevated temperatures by any convenient means such as baking ovens or banks or infra-red heat lamps. Curing temperatures are preferably from about 135° C. to about 165° C., although curing temperatures from about 100° C. to about 230° C. may be employed, if desired.

The invention will be further understood by referring to the following detailed examples. It should be understood that these specific examples are presented by way of illustration and not by way of limitation. Unless otherwise specified, all references to "parts" are intended to mean parts by weight.

EXAMPLE 1

Preparation of Epoxy-Ester Dispersing Resin

An epoxy-ester dispersing resin was prepared according to the following procedure. Into a suitable reactor where charged 1280 parts Epon 829 (trademark; Shell Chemical Company; diepoxide resin), 954 parts Empol 1016 (trademark; Emery Industries, Inc.; dimer acid), 364 parts soya fatty acid, 268 parts 2,2-bis(hydroxymethyl)propionic acid, and 13 parts lithium neodeconoate. The temperature of the mixture was brought up to about 180° C., at which point an exothermic reaction took place that raised the temperature to about 200° C. After about one hour the acid number was found to be less than 2. 940 parts Solvesso 100 and 305 parts Solvesso 150 are added and the mixture was cooled. The resin was found to have a viscosity of $Z_7$ at 70.0% non-volatiles.

EXAMPLE 2

In this Example an aliphatic diol is prepared for use in making hydroxy functional epoxy ester resin precursor. In a suitable reactor are charged 1875 parts azelaic acid and 4 parts of an organo-chromium(III) catalyst sold under the trade designation AMC-2 by Cordova Chemical Company, Sacramento, Calif. The mixture is slowly heated to 65° C. without agitation to melt the azelaic acid. The agitator is turned on and 1200 parts propylene oxide are added dropwise over 6 hours to maintain the mixture at 65°–70° C. Subsequently, about 30 minutes after the addition of propylene oxide is completed, the acid number is determined to be less than 1. A partial vacuum was applied to remove any excess propylene oxide; the mixture is then allowed to cool. The resulting product has a viscosity of L at 100% solids.

EXAMPLE 3

In this Example is prepared an hydroxy functional epoxy-polyeser graft copolymer according to the invention. In a suitable reactor are charged 640 parts Epon 829 (trademark; Shell Chemical Company; piepoxide resin), 151 parts bisphenol A, and 122 parts aliphatic diol prepared according to Example 2. The temperature of the mixture is slowly raised to 170° C., at which point an exothermic reaction occurs which raises the temperature to 180°–190° C. The mixture is maintained at 175° C. for 1 hour, and then cooled to 120° C. Then 3 parts benzyl dimethyl amine are added to the mixture and the progress of the reaction is followed by epoxy equivalent weight ("WPE") measurement; after two hours the WPE is determined to be 850–950. 160 parts 2,2-bis(hyrdoxymethyl)propionic acid, 150 parts Solvesso 150 (trademark; Shell Chemical Company; aromatic solvent), and 3 parts lithium neodecanoate are added to the mixture. The temperature of the mixture is raised to 160° C. and after about 1 hour the acid number is found to be less than 1. 1600 parts epsilon-caprolactone and 1 part dibutyl tin oxide are added to the mixture. The mixture is heated to 130° C., and a mild exotherm occurs that raises the temperature to about 170° C. The mixture is maintained at 170° C. for 2 hours; the % solids of the mixture are determined (91.5% minimum). The heat is removed; 380 parts Solvesso 150 are added and the mixture is allowed to cool. The resulting product has $Z_7$ viscosity at 80.0% solids.

EXAMPLE 4

In this Example is prepared a hydroxy functional epoxy-polyester graft copolymer according to the invention. In a suitable reactor are charged 304 parts Epon 829 (trademark; Shell Chemical Company; diepoxide resin), 84 grams bisphenol A, 112 parts PCP-0200 (trademark; Union Carbide; an aliphatic diol, specifically, polycaprolactone diol), and 50 parts xylene. The mixture is brought to reflux; a partial vacuum is applied to remove the xylene and residual water. 2 parts benzyl dimethyl amine are added and the mixture is raised to 160° C. The mixture is reacted to G-H viscosity (tested as 15 parts mixture and 15 parts cellosolve yielding a 50.0% solids solution). The mixture is cooled to 120° C., and 2.0 parts of benzyl dimethyl amine are added. The progress of the reaction is followed by viscosity measurement. After 2 hours the viscosity is determined to be P-Q (tested as 20 parts mixture and 20 parts cellosolve yielding at 50% solids solution). Then 56 parts 2,2-bis(hydroxymethyl)propionic acid, 181 parts Solvesso 150 (trademark; Shell Chemical Company; aromatic solvent) and 2.0 parts lithium neodecanoate are added to the mixture and the temperature was raised to 160° C. After about 1 hour the acid number is found to be less than 1. Subsequently, 556 parts epsilon-caprolactone and 0.5 parts monobutyl tin anhydride are added to the mixture and the temperature is brought up to 175° C. The progress of the reaction is followed by viscosity and solids measurement. After 2 hours the reaction is stopped at Z viscosity (measured as 20 parts mixture and 9 parts M-pyrol yielding a 60.0% solids solution) and 86.3% solids. At that point, heating is removed and 97 parts M-pyrol added; the mixture is allowed to cool. The resulting product has a $Z_7$ viscosity at 80.0% solids.

EXAMPLE 5

Preparation of Blocked Polyisocyanate Crosslinking Agent

Into a suitable reactor were charged 870 parts methylethyl ketoxime and 180 parts Solvesso 100. 1330 parts of PAPI 27 (trademark; Upjohn Chemical Company; aromatic polyisocyanate) was added dropwise to the mixture over two hours and the reaction temperature increases from room temperature to 80°–95° C. 39 parts 2-ethylhexanol was added to the mixture and the temperature of the mixture was maintained at 85°–95° C. for one hour. At that point, 516 parts of M-pyrol was added and the mixture was cooled. The resulting resin was dark brown and had a viscosity of 6000 cps at 75.0% solids.

EXAMPLE 6

Preparation of Blocked Polyisocyanate Crosslinking Agent

Into a suitable reactor were charged 537 parts methylethyl ketoxime. 784 parts PAPI 94 (trademark; Upjohn Chemical Company; aromatic polyisocyanate) was added dropwise over two hours; the reaction temperature rose from room temperature to 85°–95° C. After 30 minutes, the mixture was checked to insure complete reaction of the isocyanate by infrared spectroscopy. If residual isocyanate was detected, additional methylethyl ketoxime was added to the mixture. Subsequently, 300 parts methylamyl ketone and 150 parts M-pyrol were added and the mixture was cooled.

EXAMPLES 7–10

Preparation of Blocked Polyisocyanate Crosslinking Agent

Blocked isocyanate crosslinkers were prepared in the manner of Example 6. The components employed are shown in the table below.

| | Example | | | |
|---|---|---|---|---|
| | 7 | 8 | 9 | 10 |
| Composition | Parts | | | |
| L-2991 A* | 360 | 360 | 360 | |
| Desmodur IL* | | | | 525 |
| methyl ethyl ketoxime | 174 | | | 87 |
| benzotriazole | | 238 | | |
| epsilon-caprolactam | | | 227 | |
| N—methyl pyrrolidone | 133 | 150 | 195 | 461 |
| percent non-volatiles | 80 | 80.1 | 75.1 | 57 |
| Viscosity | $Z_1$ | $Z_6$ | $Z_2$ | Z |

*Trademarks of Mobay Chemical Co.; L-2291 A is a biurette of hexamethylene diisocyanate; Desmodur IL is a polyisocyanurate of tolylene diisocyanate.

EXAMPLE 11

Millbase Preparation

In a one gallon can or ballmill are charged the following materials and one quart of diagonal shot. The mixture is placed on a roller mill for 16–24 hours to reach a 7+ Hegman dispersion. At that point, the letdown is added, and the mixture is run an additional hour on the roller mill.

| | Parts |
|---|---|
| Hi-Sol #3* | 585 |
| 2-Ethyl Hexanol | 95 |
| Polyethylene Wax | 70 |
| Anti-Terra-U** | 40 |
| Resin of Example 1 | 103 |
| Barytes | 2259 |
| TiO$_2$ | 429 |
| Carbon Black | 29 |
| Strontium Chromate | 143 |
| Letdown: Resin of Example 1 | 247 |

*Trademark of Ashland Chemical Co., Columbus, Ohio; Hi-Sol #3 is an aromatic solvent.
**Trademark of Byk Mallinckrodt, Wallingford, CT 06492; Anti-Terra-U is an antisettling and wetting agent.

EXAMPLE 12

Bentone Gel Preparation

To a clean Ball Mill are charged the following:

| | Parts |
|---|---|
| Solvesso 150* | 513 |
| Propylene Carbonate | 13 |
| Bentone 38** | 30 |
| After grinding for 30 minutes is added: | 384 |
| Resin of Example 1 | |
| Grinding for approximately 2 hours yields an 8 Hegman | 60 |
| dispersion. At that point the letdown is added: | |
| Solvesso 150 | |
| | 1000 |

*Trademark; Shell Chemical Company; an aromatic solvent
**Trademark; NL Industries. Inc.; anti-settling agent to control the thixotropic properties of the composition.

EXAMPLES 13-15

Coating compositions according to the present invention are prepared according to the following formulations.

| Composition | Coating Compositions Example | | |
|---|---|---|---|
| | 13 | 14 Parts | 15 |
| Resin of Example 4 | 2241 | 2241 | |
| Resin of Example 3 | | | 2241 |
| Millbase of Example 11 | 5788 | 5788 | 5788 |
| Bentone Gel of Example 12 | 2315 | 2315 | 2315 |
| Crosslinker of Example 5 | 984 | | 984 |
| Crosslinker of Example 6 | | 1050 | |
| Dislon* | 114 | 120 | 120 |
| Cab-O-sil** | 142 | | |

*Trademark; Kusumoto Chemicals, Ltd.; anti-settling agent to control the thixotropic properties of the composition.
**Trademark; Cabot Corporation; anti-settling agent to control the thixotropic properties of the composition.

The coating compositions are prepared by sequential mixing in a 5 gallon working capacity EMCO Proto-Lab SW Mill (trademark), Epworth Mfg. Go., South Haven, Mich., set at 900 rpm. Resin and Dislon are first mixed for approximately 10 minutes and then millbase. Bentone gel and crosslinker are added sequentially while mixing. Finally, Cab-O-Sil is added and the composition mixed until a grind of 6+ on the Hegman scale is obtained.

The resulting compositions each is sprayed at 140°-160° C. using hot-spray equipment commercially available from Nordson Corp. Unpolished Bonderite steel panels are sprayed and baked at 135° C. for 20 minutes. The thickness of the coating tested varies from 5 mils to 12 mils. The panels are top-coated with white enamel and tested for chip resistance using 10 pts. of gravel in the gravelometer test. All the above compositions exhibit excellent chip resistance. In addition, the panels show excellent corrosion resistance (500 hrs. salt spray test, scribed panels) and humidity resistance.

EXAMPLES 16-19

Additional coating compositions according to the invention are made according to the method of Examples 13-15 and according to the following formulations.

| Composition | Example | | | |
|---|---|---|---|---|
| | 16 | 17 | 18 | 19 |
| | Parts | | | |
| Resin of Example 4 | 2241 | 2241 | 2241 | 2241 |
| Millbase of Example 11 | 5788 | 5788 | 5788 | 5788 |
| Bentone Gel of Example 12 | 2315 | 2315 | 2315 | 2315 |
| Crosslinker of Example 7 | 922 | | | |
| Crosslinker of Example 8 | | 922 | | |
| Crosslinker of Example 9 | | | 984 | |
| Crosslinker of Example 10 | | | | 1294 |
| Dislon* | 100 | 100 | 100 | 100 |

Coatings on motor vehicle body panels, made from the compositions of Examples 16-19 are found to provide good corrosion protection and good protection against stone chipping and the like.

Many modifications of this invention will be apparent, in view of this disclosure, to those skilled in the art. It is intended that all such apparent modifications fall within the true scope of this invention and be included within the terms of the appended claims.

INDUSTRIAL APPLICATION

It will be apparent from the foregoing that this invention has industrial applicability as a coating composition, especially as a hot sprayable, high solids coating composition suitable for use as a chip resistant automotive vehicle primer adapted for use on body panel areas subject to chipping by stones, gravel and other road debris.

What is claimed is:

1. An organic solvent based, thermosetting coating composition comprising:
(A) hydroxy functional epoxy-polyester graft copolymer having a number average molecular weight ($M_n$) of between about 2,000 and about 20,000, said copolymer being the product of polymerization of lactone monomers in the presence of hydroxy functional epoxy ester resin precursor, said precursor having a number average molecular weight ($M_n$) of between about 1,000 and about 4,000 and being the reaction product of diepoxide with (a) aliphatic diol in chain extension reaction and, subsequently, (b) acid component in chain termination reaction in approximately 1 to 1 equivalent ratio with chain extended reaction product, said acid component comprising primary hydroxy functional acid, wherein said polymerization of said lactone monomers is carried out at a temperature between about 50° C. and about 300° C. and the polymerization reaction mixture comprises between about 10 and about 80 weight percent said hydroxy functional epoxy ester resin precursor and between about 90 and about 20 weight percent said lactone monomers; and
(B) blocked polyisocyanate crosslinking agent comprising more than one isocyanate group reversibly blocked by reaction with an active hydrogen bearing blocking agent, said blocked polyisocyanate crosslinking agent being included in an amount such that upon de-blocking of the blocked isocyanate groups thereof at the cure temperature of the composition, said crosslinking agent provides between about 0.5 and about 1.6 reactive isocyanate groups per reactive group on said hydroxy functional epoxy-polyester graft copolymer.

2. The solvent based, thermosetting coating composition in accordance with claim 1, wherein said diepoxide is selected from the group consisting of bisphenol-A epichlorohydrin epoxy resin, hydantoin epoxy resin, cyclic and acyclic aliphatic diepoxides, and a compatible mixture of any of them.

3. The solvent based, thermosetting coating composition of claim 1, wherein said diol is selected from the group consisting of alkyl substituted or unsubstituted propanediol, butanediol, pentanediol, hexanediol, and a mixture of any of them.

4. The solvent based, thermosetting coating composition of claim 3, wherein said aliphatic diol bears two terminal hydroxy functionality.

5. The solvent based thermosetting coating composition in accordance with claim 1, wherein said primary hydroxy functional acid is selected from $C_3$-$C_{26}$ acids bearing a single carboxyl group, at least one primary hydroxyl group, and no additional functionality which would react substantially with the chain extension reactants or reaction product.

6. The solvent based, thermosetting coating composition in accordance with claim 1 wherein said acid component further comprises fatty acid.

7. The solvent based, thermosetting coating composition in accordance with claim 6, wherein said fatty acid is selected from the group consisting of Soya fatty acid, butyric, lauric, palmitic and stearic fatty acid and a compatible mixture of any of them.

8. The solvent based, thermosetting coating composition in accordance with claim 1, wherein said lactone monomers have the general formula

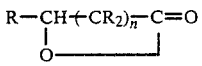

wherein n is at least 4, at least n+2 R's are H and the remaining R's are substituents selected from the group consisting of alkyl, cycloalkyl, alkyoxy and single ring aromatic hydrocarbon radicals.

9. The solvent based, thermosetting coating composition in accordance with claim 8, wherein said lactone monomers comprise unsubstituted epsilon-caprolactone.

10. The solvent based, thermosetting coating composition in accordance with claim 1, wherein said blocked polyisocyanate crosslinking agent comprises blocked polymethylene polyphenol isocyanate which in the unblocked state has the formula

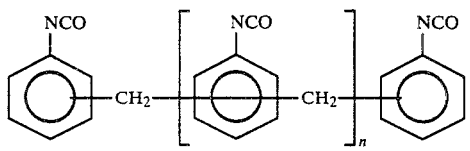

wherein n equals 1 to 3.

11. The solvent based, thermosetting coating composition in accordance with claim 1, wherein said blocked polyisocyanate crosslinking agent comprises the reaction product of an active hydrogen-bearing blocking agent with polyisocyanate comprising isocyanurate ring-bearing polyisocyanate prepared by cyclotrimerization of diisocyanate.

12. The solvent based, thermosetting coating composition in accordance with claim 1, wherein said blocked polyisocyanate crosslinking agent is the reaction product of (A) the reaction product of (i) organic diisocyanate represented by the formula

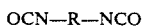

wherein R is selected from the group consisting of aliphatic, cycloaliphatic and aromatic radicals and combinations thereof and wherein one of the isocyanate groups thereof is more reactive than the other and (ii) sufficient active hydrogen containing blocking agent to react with substantially all of the more reactive isocyanato groups; and (B) sufficient polyol to react with substantially all remaining isocyanato groups.

13. The solvent based, thermosetting coating composition in accordance with claim 1, adapted to be used as a chip resistant primer to be sprayed at elevated temperature, wherein the solids level of the composition is in the range of 60–80% by weight.

14. An organic solvent based, thermosetting coating composition comprising:

(I) hydroxy functional epoxy-polyester graft copolymer having a number average molecular weight ($M_n$) between about 2,000 and about 20,000, said copolymer being the reaction product of polymerization of epsilon-caprolactone monomers having the general formula

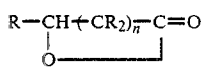

wherein n is at least 4, at least n+2 R's are hydrogen and the remaining R's are substituents selected from the group consisting of alkyl, cycloalkyl, alkoxy and single ring aromatic hydrocarbon radicals.

in the presence of hydroxy functional epoxy ester resin precursor having a number average molecular weight ($M_n$) between about 1,000 and 4,000, said precursor being the reaction product of (i) diepoxide selected from the group consisting of bisphenol-A epichlorohydrin epoxy resin, hydantoin epoxy resin, cyclic and acyclic aliphatic diepoxide, and a compatible mixture of any of them, (ii) aliphatic diol bearing two terminal hydroxy functionality and being selected from the group consisting of alkyl substituted or unsubstituted propanediol, butanediol, pentanediol, hexanediol, and a compatible mixture of any of them in chain extension reaction, and (iii) acid component in chain termination reaction in approximately 1 to 1 equivalent ratio with chain extended reaction product, said acid component comprising primary hydroxy functional acid selected from the group consisting of dimethylolproprionic acid, bis(hydroxypropyl)-propionic acid, and a compatible mixture thereof, wherein said polymerization of said epsilon-caprolactone is carried out at a temperature between about 130° C. and about 200° C. and the polymerization reaction mixture comprises between about 10 and about 80 weight percent said hydroxy functional epoxy ester resin precursor and between about 90 and about 20 weight percent said lactone monomers; and (II) blocked polyisocyanate crosslinking agent comprising more than one isocyanate group reversibly blocked by reaction with an active hydrogen bearing blocking agent, said blocked polyisocyanate crosslinking agent being included in an amount effective to provide at a cure temperature of the composition, between about 0.5 and about 1.6 deblocked reactive isocyanate groups per reactive group on said epoxy-polyester graft copolymer.

* * * * *